(12) United States Patent
Reichow et al.

(10) Patent No.: US 10,926,641 B2
(45) Date of Patent: Feb. 23, 2021

(54) CONTROL APPARATUS FOR AN ENERGY STORAGE UNIT

(71) Applicant: Continental Automotive GmbH, Hannover (DE)

(72) Inventors: Dirk Reichow, Wenzenbach (DE); Peter Voilkl, Wenzenbach (DE); Michael Scheurer, Vierkirchen (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 196 days.

(21) Appl. No.: 16/042,728

(22) Filed: Jul. 23, 2018

(65) Prior Publication Data

US 2019/0031032 A1    Jan. 31, 2019

(30) Foreign Application Priority Data

Jul. 27, 2017   (DE) ..................... 10 2017 212 891.7

(51) Int. Cl.
*B60L 3/12*        (2006.01)
*H02J 1/12*        (2006.01)
(Continued)

(52) U.S. Cl.
CPC ........ *B60L 3/12* (2013.01); *B60L 1/00* (2013.01); *B60L 58/20* (2019.02); *B60L 58/24* (2019.02);
(Continued)

(58) Field of Classification Search
CPC .... B60L 3/12; B60L 1/00; B60L 58/24; B60L 58/20; B60L 2260/42; B60R 16/03; B60R 16/033; H02J 1/12; H02J 7/34
See application file for complete search history.

(56) References Cited

U.S. PATENT DOCUMENTS

| 6,741,065 B1 * | 5/2004 | Ishii ........................ B60L 58/15 |
| | | 320/122 |
| 6,995,543 B2 | 2/2006 | Nunomaki et al. ........... 320/132 |

(Continued)

FOREIGN PATENT DOCUMENTS

| DE | 60033833 T2 | 1/2008 | .............. B60L 11/18 |
| DE | 102013203604 A1 | 9/2013 | ........... B60R 16/033 |

(Continued)

OTHER PUBLICATIONS

Japanese Office Action, Application No. 2018140231, 5 pages, dated May 8, 2019.

(Continued)

*Primary Examiner* — Thomas Ingram
(74) *Attorney, Agent, or Firm* — Slayden Grubert Beard PLLC

(57) ABSTRACT

Various embodiments may include a control apparatus for an energy storage unit of a motor vehicle comprising: a non-volatile memory storing a first initial configuration for a first energy storage unit and a second initial configuration for a second energy storage unit. The memory is connected to a further memory having a first adaptation configuration for the first energy storage unit and a second adaptation configuration for the second energy storage unit. The non-volatile memory comprises a first memory part storing the first initial configuration and a second memory part electrically decoupled from the first memory part storing the second initial configuration.

10 Claims, 3 Drawing Sheets

(51) Int. Cl.
  *B60L 1/00* (2006.01)
  *H02J 7/34* (2006.01)
  *B60L 58/24* (2019.01)
  *B60L 58/20* (2019.01)
  *B60R 16/033* (2006.01)

(52) U.S. Cl.
  CPC .............. *B60R 16/033* (2013.01); *H02J 1/12* (2013.01); *H02J 7/34* (2013.01); *B60L 2260/42* (2013.01)

(56) References Cited

U.S. PATENT DOCUMENTS

| | | | |
|---|---|---|---|
| 7,885,181 B2 | 2/2011 | Ban et al. | 370/219 |
| 9,522,599 B2 | 12/2016 | Gibbs | |
| 9,952,289 B2 | 4/2018 | Hanyu et al. | |
| 2002/0021110 A1* | 2/2002 | Nakagawa | G01R 31/3842 |
| | | | 320/136 |
| 2011/0300416 A1* | 12/2011 | Bertness | B60L 53/65 |
| | | | 429/49 |
| 2014/0222359 A1 | 8/2014 | Ko et al. | 702/63 |
| 2016/0226263 A1* | 8/2016 | Seo | B60L 58/14 |
| 2019/0204392 A1* | 7/2019 | Bertness | B60L 3/0046 |

FOREIGN PATENT DOCUMENTS

| | | | | |
|---|---|---|---|---|
| JP | 2016085166 A | 5/1916 | | G01R 31/36 |
| JP | 2016086640 A | 5/1916 | | H01M 10/44 |
| JP | 03277130 A | 12/1991 | | G06F 1/28 |
| JP | 0690238 A | 3/1994 | | G06F 13/368 |
| JP | 2008166990 A | 7/2008 | | H04L 12/437 |
| JP | 2011133488 A | 7/2011 | | G01R 31/36 |
| JP | 2013044598 A | 3/2013 | | G01R 31/36 |

OTHER PUBLICATIONS

German Office Action, Application No. 102017212891.7, 6 pages, dated Apr. 6, 2018.

Japanese Office Action, Application No. 2018140231, 3 pages, dated Mar. 30, 2020.

* cited by examiner

CONTROL APPARATUS FOR AN ENERGY STORAGE UNIT

CROSS-REFERENCE TO RELATED APPLICATIONS

This application claims priority to DE Application No. 10 2017 212 891.7 filed Jul. 27, 2017, the contents of which are hereby incorporated by reference in their entirety.

TECHNICAL FIELD

The present disclosure relates to energy storage. Various embodiments may include a control apparatus for at least a first energy storage unit of a motor vehicle and a second energy storage unit of the motor vehicle.

BACKGROUND

An energy storage unit, e.g., a rechargeable battery, is usually controlled or monitored by a control apparatus. The energy storage unit can be controlled by the control apparatus according to the specification on the basis of an item of configuration information which is usually specific to the rechargeable battery. This includes, for example, the consideration of a maximum temperature, the progress of a charging operation, the progress of a discharging operation, the consideration of the number of cells, a maximum charging current, a maximum discharging current or a maximum electrical voltage.

Modern vehicle electrical systems in vehicles may comprise one or more energy systems or vehicle electrical system branches which can each consume and/or provide energy. The control apparatus or a control device manages the energy systems. Over time, the energy systems are subject to physical discharge and tend toward the zero-energy state. The control device must be able to retain its settings even in the zero-energy state. A permanent, non-volatile configuration of the control device can be carried out by means of a non-volatile (data) memory, for example an OTP (one-time-programmable) memory inside the control device. The settings programmed in the non-volatile memory are read out each time the control device is started and are adopted in a main memory.

SUMMARY

The teachings of the present disclosure may provide a control apparatus and a method which can be used to control energy storage units in a more reliable manner. For example, in some embodiments, a control apparatus has a non-volatile memory having a first initial configuration of the first energy storage unit and a second initial configuration of the second energy storage unit. The non-volatile memory is connected in a data-transmitting manner to a further memory having an adaptation configuration of the first energy storage unit and of the second energy storage unit. The invention also relates to a method for operating a control apparatus for at least a first energy storage unit of a motor vehicle and a second energy storage unit of the motor vehicle. In the method, a first initial configuration of the first energy storage unit and a second initial configuration of the second energy storage unit are read from a non-volatile memory.

In some embodiments, a control apparatus (2) for at least a first energy storage unit (6) of a motor vehicle (1) and a second energy storage unit (9) of the motor vehicle (1), has a non-volatile memory (16) having a first initial configuration (22) of the first energy storage unit (6) and a second initial configuration (23) of the second energy storage unit (9), wherein the non-volatile memory (16) is connected in a data-transmitting manner to a further memory (17) having an adaptation configuration (24) of the first energy storage unit (6) and of the second energy storage unit (9), characterized in that the non-volatile memory (16) has a first memory part (20) having the first initial configuration (22) and a second memory part (21) which is electrically decoupled from the first memory part (20) and has the second initial configuration (23).

In some embodiments, the first memory part (20) is electrically connected to the further memory (17) using a first data line (25) and the second memory part (21) is electrically connected to the further memory (17) using a second data line (26) which differs from the first data line (25).

In some embodiments, the first memory part (20) is connected to a voltage supply for the first energy storage unit (6) and/or the second memory part (21) is connected to a voltage supply for the second energy storage unit (9).

In some embodiments, the further memory is connected (only) to a voltage supply for the second energy storage unit.

In some embodiments, the control apparatus (2) has a functional unit (18) which controls the first energy storage unit (6) and the second energy storage unit (9) on the basis of the first initial configuration (22) and the second initial configuration (23), and the functional unit (18) is electrically connected directly to the first memory part (20) by means of a third data line (27).

In some embodiments, the functional unit (18) is connected to a voltage supply for the first energy storage unit (6) and to a voltage supply for the second energy storage unit (9).

In some embodiments, the further memory (17) is electrically connected to a control unit (19) which is set up to adapt the adaptation configuration (24) on the basis of a functional unit (18) of the control apparatus (2).

In some embodiments, the first energy storage unit (6) is in the form of an on-demand energy store and the second energy storage unit (9) is in the form of a normal energy store.

In some embodiments, the further memory (17) is in the form of a volatile memory.

Some embodiments include a method for operating a control apparatus (2) for at least a first energy storage unit (6) of a motor vehicle (1) and a second energy storage unit (9) of the motor vehicle (1), in which a first initial configuration (22) of the first energy storage unit (6) and a second initial configuration (23) of the second energy storage unit (9) are read from a non-volatile memory (16), characterized in that the first initial configuration (22) is read from a first memory part (20) of the non-volatile memory (16) and the second initial configuration (22) is read from a second memory part (21) of the non-volatile memory (16) which is decoupled from the first memory part (20).

BRIEF DESCRIPTION OF THE DRAWINGS

Exemplary embodiments of the teachings herein are explained in more detail below on the basis of schematic drawings. In the figures, identical or functionally identical elements are provided with identical reference signs. In the drawings.

DETAILED DESCRIPTION

Figure 1:
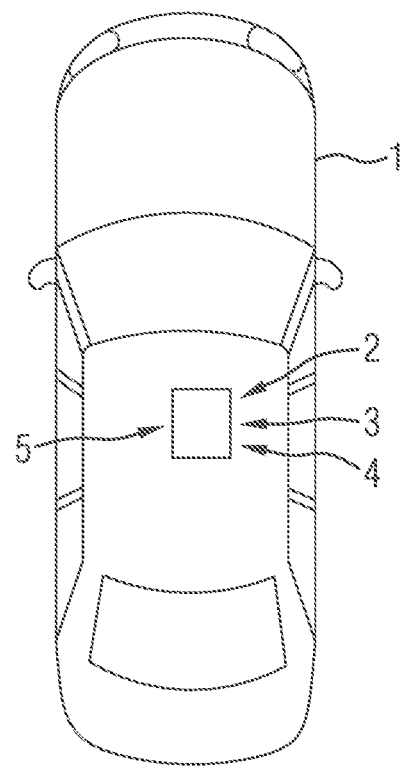
FIG. 1 shows a schematic plan view of a motor vehicle having an exemplary embodiment of a control apparatus according to the teachings of the present disclosure.

In some embodiments, a control apparatus for at least a first energy storage unit of a motor vehicle and a second energy storage unit of the motor vehicle comprises a non-volatile memory having a first initial configuration of the first energy storage unit and a second initial configuration of the second energy storage unit.

The non-volatile memory is connected in a data-transmitting manner to a further memory. The further memory has an adaptation configuration of the first energy storage unit and of the second energy storage unit. As an important concept, provision is made for the non-volatile memory to have a first memory part having the first initial configuration and a second memory part which is electrically, in particular functionally, decoupled from the first memory part and has the second initial configuration.

The control apparatus can be operated in a more reliable manner by electrically decoupling the first memory part and the second memory part. For example, in the event of failure of the second memory part, the first memory part is also not immediately affected. In particular, the first memory part and the second memory part are also functionally decoupled as a result of the electrical decoupling, and a malfunction of one memory part, in particular the second memory part, does not influence the functionality of the other memory part, in particular the first memory part. The operation of the first energy storage unit can be controlled by means of the first initial configuration and the operation of the second energy storage unit can be controlled by means of the second initial configuration. The respective initial configuration is, for example, a parameter set containing limit values, in particular maximum values or minimum values, which is provided for the purpose of operating the respective energy storage unit without problems. The respective initial configuration states, for example, the number of cells in the respective energy storage unit or else a maximum charging current, a maximum discharging current, a maximum temperature or a maximum voltage of the respective energy storage unit.

The respective initial configuration is stored in the non-volatile memory and is available again even after a power interruption. In some embodiments, the non-volatile memory and the further memory are in the form of data memories. Furthermore, the non-volatile memory is in the form of an OTP (one-time-programmable) memory, in particular. This memory can be written to only once.

The situation may occur in which the respective initial configuration must be adapted, for example because new knowledge with regard to how the respective energy storage unit can be operated in an improved manner has been obtained for the respective energy storage unit or because the respective energy storage unit requires adapted operation for reasons of age. The adaptation configuration of the respective energy storage unit can then be used for the adaptation. The respective initial configuration can be at least partially adapted by means of the adaptation configuration. The initial configuration can therefore be adapted by means of the adaptation configuration even after the non-volatile, e.g. one-time programmable, memory has been programmed. In some embodiments, a part of the respective initial configuration or else the entire respective initial configuration can be adapted by means of the adaptation configuration. In this case, the adaptation configuration can either replace values of the respective initial configuration or can reduce or increase them. In some embodiments, the first memory part may be electrically connected to the further memory using a first data line and for the second memory part to be electrically connected to the further memory using a second data line which differs from the first data line. As a result, the respective memory parts are connected to the further memory using different data lines and, in the event of failure, in particular of the power supply, of one of the memory parts, the remaining memory part can still transmit data to the further memory.

In some embodiments, the first memory part may be connected to a voltage supply for the first energy storage unit and/or for the second memory part to be connected to a voltage supply for the second energy storage unit. As a result of the respective memory parts being separately connected to the respective voltage supply, the respective memory parts can be operated independently of one another.

In some embodiments, the further memory may be connected to a voltage supply for the second energy storage unit. The second energy storage unit is in the form of a normal energy store or main energy store, in particular, and supplies the further memory with the energy needed for operation. The energy supply can be enabled in a sufficient manner by supplying the further memory with energy from the second energy storage unit.

In some embodiments, the control apparatus may have a functional unit which controls the first energy storage unit and the second energy storage unit on the basis of the first initial configuration and the second initial configuration, and for the functional unit to be electrically connected to the first memory part by means of a third data line. The functional unit, in particular, then functionally controls the respective energy storage unit on the basis of the associated initial configuration and preferably also on the basis of the associated adaptation configuration (if it is available). The functional unit therefore controls the first energy storage unit and/or the second energy storage unit. The functional unit may be, for example, in the form of a DSP (digital signal processor), a microcontroller, an FPGA (field programmable gate array) or an ASSP (application specific standard product). The third data line transmits data between the first memory part and the functional unit even when the further memory has failed, for example on account of the absence of a voltage supply. The third data line can therefore be considered to be a back-up line or a protection line since it is used, in particular, when the first data line and/or the further memory has/have failed.

In some embodiments, the functional unit may be connected to a voltage supply for the first energy storage unit and to a voltage supply for the second energy storage unit. As a result of the functional unit being connected to the voltage supplies for the first energy storage unit and the second energy storage unit, the functional unit can be operated even if one of the two voltage supplies or one of the two energy storage units fails. The voltage supply for the functional unit has a redundant design, in particular, as a result.

In some embodiments, the further memory to be electrically connected, in particular directly, to a control unit which is set up to adapt the adaptation configuration on the basis of a functional unit of the control apparatus. The further memory can be filled or overwritten by the control unit. The control unit receives the instruction for this from the functional unit, in particular. The control unit therefore receives the request, for example from the functional unit, to adapt the adaptation configuration in the further memory or, if the adaptation configuration is not yet available there, for example after a restart, to newly store the adaptation configuration. The control unit is preferably connected to a voltage supply for the second energy storage unit. In a similar manner to the functional unit, the control unit may likewise be in the form of a DSP, a microcontroller, an FPGA, an ASIC or an ASSP, for example.

In some embodiments, the first energy storage unit may comprise an on-demand energy store or a protection energy store and for the second energy storage unit may comprise a normal energy store. The normal energy store may be the main energy store. The first energy storage unit or the protection energy store protects a switch, a DC-DC converter, a peripheral load or the second energy storage unit if the second energy storage unit fails. The first energy storage unit also protects itself. A safety function with respect to overvoltage, for example, can be provided by the protection energy store.

In some embodiments, the further memory may comprise a volatile memory. In the case of a volatile memory, the data are retained only as long as the energy supply is available. The volatile memory has a higher access speed, in particular during reading and writing, than is enabled by a non-volatile memory, for example.

In some embodiments, a control apparatus for at least a first energy storage unit of a motor vehicle and a second energy storage unit of the motor vehicle is operated in a method. A first initial configuration of the first energy storage unit is read from a non-volatile memory. Furthermore, a second initial configuration of the second energy storage unit is read from the non-volatile memory. As an important concept, provision is made for the first initial configuration to be read from a first memory part of the non-volatile memory and for the second initial configuration to be read from a second memory part of the non-volatile memory which is electrically decoupled from the first memory part.

Embodiments of the control apparatus described herein should be regarded as analogous embodiments of the method. The relevant components of the control apparatus are each designed to carry out the respective method steps. Further features of the invention emerge from the claims, the figures and the description of the figures. The features and combinations of features mentioned in the description above and the features and combinations of features mentioned in the description of the figures below and/or shown in the figures alone can be used not only in the respectively stated combination, but also in other combinations or alone without departing from the scope of the teachings herein.

FIG. 1 shows a schematic plan view illustration of a motor vehicle 1. The motor vehicle 1 has a control apparatus 2. The control apparatus 2 is electrically connected to a first energy system 3, a second energy system 4 and a third energy system 5. In the present case, a region of a power supply system of the motor vehicle 1, which has an energy storage unit, a load or an energy generation unit for example, is referred to as an energy system. The respective energy system can also be referred to as a vehicle electrical system branch of a vehicle electrical system of the motor vehicle 1.

The control apparatus 2 and the energy systems 3, 4, 5 can be arranged in various ways in the motor vehicle 1, but typically in such a manner that the arrangement is functional. The motor vehicle 1 may comprise an automobile.

Figure 2:
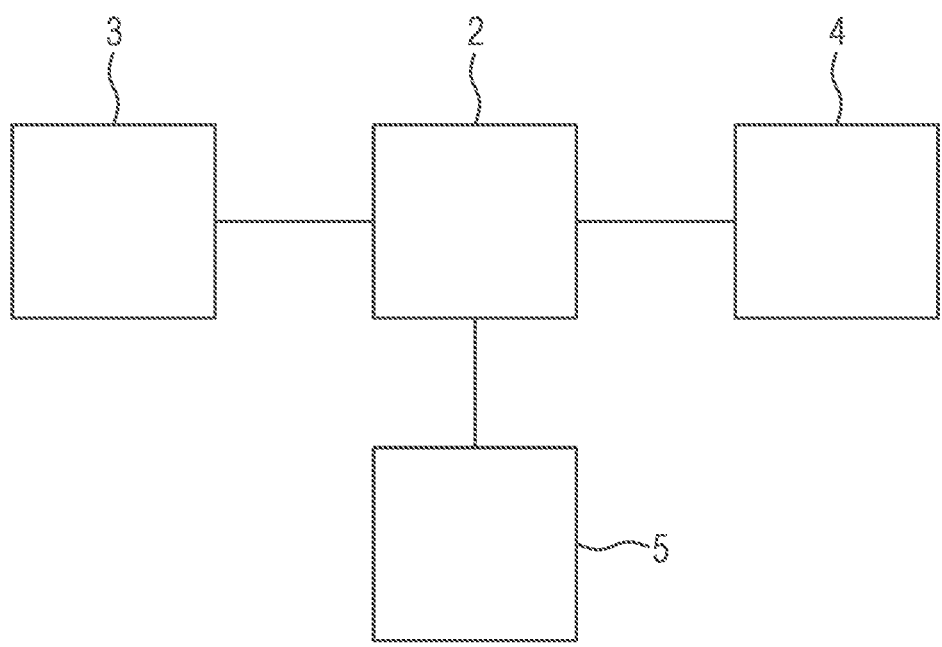
FIG. 2 shows a schematic illustration of the control apparatus having three energy systems of the motor vehicle according to the teachings of the present disclosure.
Figure 3:
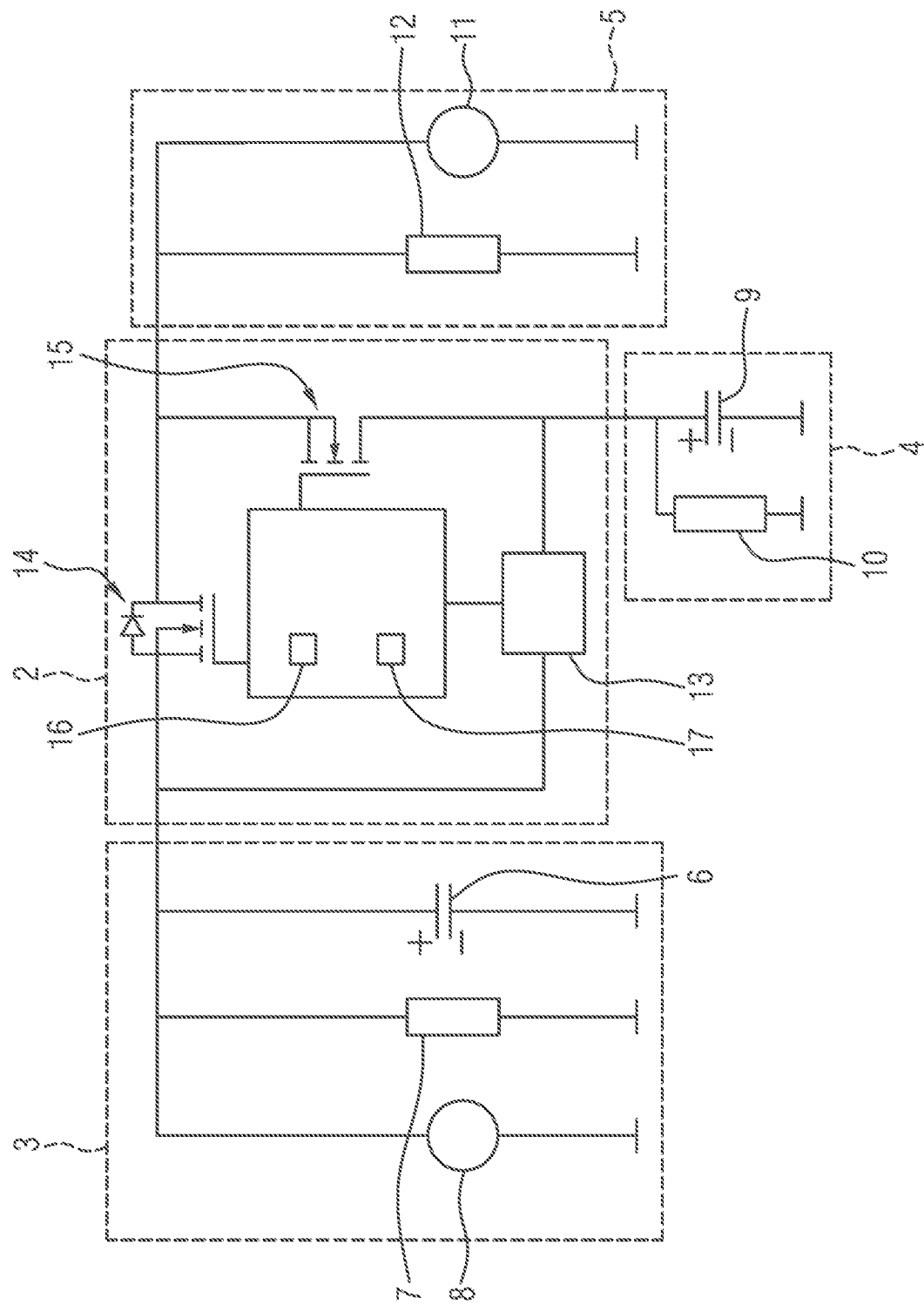
FIG. 3 shows a further schematic illustration of the control apparatus having the detailed energy systems according to the teachings of the present disclosure.

FIG. 2 shows the control apparatus 2, the first energy system 3, the second energy system 4, and the third energy system 5. The energy systems 3, 4, 5 are electrically connected to the control apparatus 2. FIG. 3 likewise shows the control apparatus 2, the first energy system 3, the second energy system 4 and the third energy system 5, but in a detailed illustration.

The first energy system 3 has a first energy storage unit 6, a first electrical load 7, and a first energy generation unit 8. The first energy storage unit 6 may comprise a lithium ion rechargeable battery, or another rechargeable battery. The first electrical load 7 may comprise an energy load of the motor vehicle 1, e.g. a heating unit, an air-conditioning compressor, a lighting unit, or an actuator, for example. The first energy generation unit 8 may comprise an electrical generator.

The second energy system 4 has a second energy storage unit 9 and a second electrical load 10. The second energy storage unit 9 is designed, in particular, in a similar manner to the first energy storage unit 6. The second electrical load 10 can be designed in a similar manner to the first electrical load 7.

The third energy system 5 has a second energy generation unit 11 and a third electrical load 12. The third electrical load 12 can be designed in a similar manner to the first electrical load 7 and/or in a similar manner to the second electrical load 10. The second energy generation unit 11 can be designed in a similar manner to the first energy generation unit 8.

In some embodiments, the control apparatus 2 has a DC-DC converter 13, a first switch 14, and a second switch 15. The control apparatus 2 also has a non-volatile memory 16 and a further memory 17. The non-volatile memory 16 is, in particular, in the form of a one-time-programmable data memory, that is to say a so-called OTP memory. The further memory 17 is preferably in the form of a volatile data memory, for example RAM (random access memory).

Figure 4:
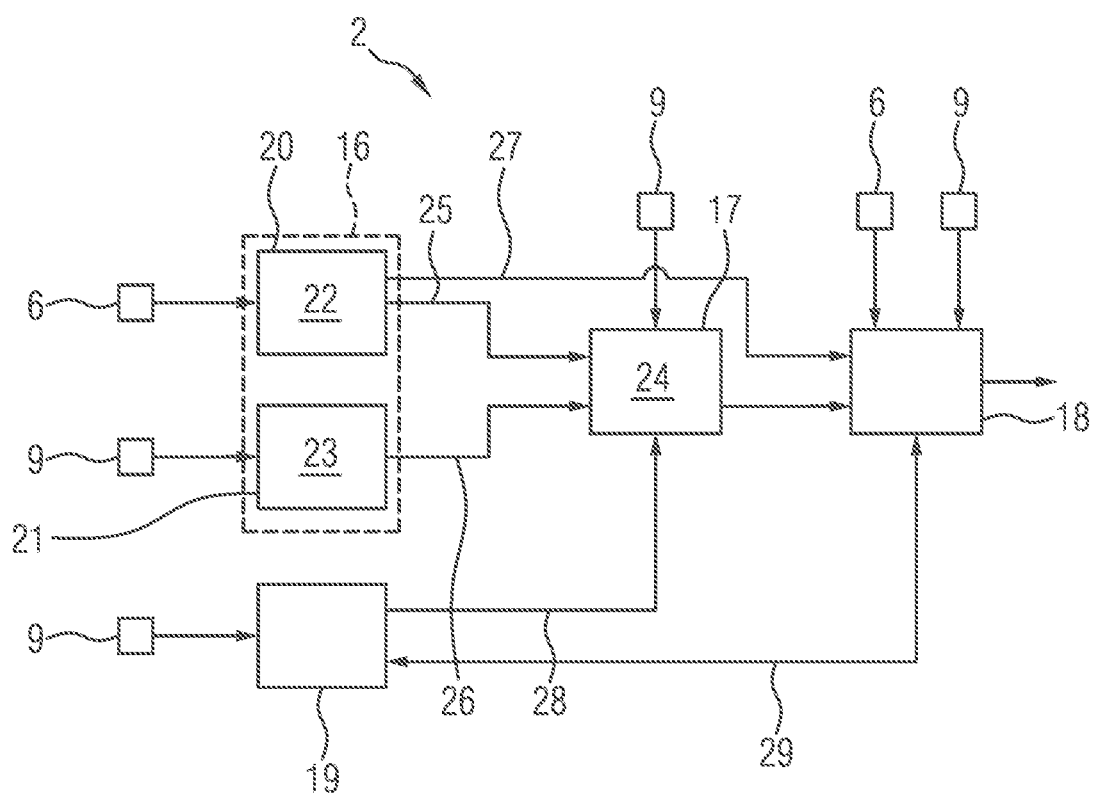
FIG. 4 shows a schematic illustration of the control apparatus having a first memory part of a non-volatile memory and a second memory part of the non-volatile memory which are electrically decoupled from one another according to the teachings of the present disclosure.

FIG. 4 shows an exemplary embodiment of the control apparatus 2. The control apparatus 2 has the non-volatile memory 16 and the further memory 17. The control apparatus 2 also has a functional unit 18 and a control unit 19. The functional unit 18 and/or the control unit 19 may be in the form of a DSP, a microcontroller, an FPGA, an ASIC or an ASSP. The non-volatile memory 16, the further memory 17, the functional unit 18 and the control unit 19 may be arranged on only one chip or may each be in the form of a separate chip.

The non-volatile memory 16 has a first memory part 20 and a second memory part 21. The first memory part 20 and the second memory part 21 are electrically decoupled. The first memory part 20 stores a first initial configuration 22 and the second memory part 21 stores a second initial configuration 23. The first initial configuration 22 is provided for the purpose of controlling the first energy storage unit 6 and the second initial configuration 23 is provided for the purpose of controlling the second energy storage unit 9. Desired operating values of the respective energy storage unit 6, 9 are predefined, for example, by the respective initial configuration 22, 23. These desired operating values can then be compared with currently captured measured values of the respective energy storage unit 6, 9. On the basis of the comparison, the respective energy storage unit 6, 9 can then be operated in an adapted manner by the functional unit 18, for example. The desired operating values may be in the form of a maximum temperature, a minimum temperature, a maximum voltage, a maximum charging current and/or a maximum discharging current, for example. However, the number of cells of the respective energy storage unit 6, 9 can also be provided by the respective initial configuration 22, 23, for example.

The further memory 17 stores an adaptation configuration 24. The adaptation configuration 24 is provided for the first energy storage unit 6 and the second energy storage unit 9. The first initial configuration 22 and/or the second initial configuration 23 can be adapted by means of the adaptation configuration 24. The adaptation may be necessary if the first energy storage unit 6 and/or the second energy storage unit 9 is/are intended to be operated in an adapted manner. The adapted operation may be necessary, for example, if the respective energy storage unit 6, is intended to be operated differently than in the basic initialization state, for example the delivery state, on account of signs of aging. However, adaptation may also be necessary if new knowledge which suggests adapted operation is available, for example in order to extend the service life of the respective energy storage unit 6, 9.

After the respective initial configuration 22, 23 has been stored in the one-time-programmable non-volatile memory 16, the adaptation cannot be directly carried out in the non-volatile memory 16, but rather is carried out by means of the adaptation configuration 24, in particular in the further memory 17.

The first memory part 20 is connected to a voltage supply for the first energy storage unit 6. The second memory part 21 is connected to a voltage supply for the second energy storage unit 9. The further memory 17 is connected to a voltage supply for the second energy storage unit 9. The first memory part 20 is hereby supplied with energy only from the first energy storage unit 6 and the second memory part 21 and the further memory 17 are supplied with energy only from the second energy storage unit 9.

The first memory part 20 is electrically connected to the further memory 17 by means of a first data line 25. Data can therefore be transmitted from the first memory part 20 to the further memory 17 via the first data line 25. The second memory part 21 is electrically connected to the further memory 17 by means of a second data line 26. Data, in particular the second initial configuration 23, can therefore be transmitted from the second memory part 21 to the further memory 17 via the second data line 26.

The functional unit 18 is electrically connected directly to the first memory part 20 via a third data line 27. Data, in particular the first initial configuration 22, can therefore be transmitted directly from the first memory part 20 to the functional unit 18 via the third data line. As a result of the third data line 27, it is also possible to transmit data from the first memory part 20 to the functional unit 18 if the first data line 25 and/or the further memory 17 has/have failed. The functional unit 18 can therefore use the first initial configuration 22 virtually as a back-up configuration without the adaptation configuration 24 in order to control the first energy storage unit 6 and/or the second energy storage unit 9 even after the second memory part 21, the second data line 26, the first data line 25 and/or the further memory 17 has/have failed.

The functional unit 18 is connected to a voltage supply for the first energy storage unit 6. The functional unit 18 is also connected to a voltage supply for the second energy storage unit 9. The functional unit 18 is therefore supplied with energy from the first energy storage unit 6 and from the second energy storage unit 9.

The control unit 19 is directly electrically connected to the further memory 17. As a result of the electrical connection, the control unit 19 can access the further memory 17, and data, in particular the adaptation configuration 24, can be transmitted from the control unit 19 to the further memory 17. The control unit 19 can adapt the adaptation configuration 24. The control unit can therefore receive a command from the functional unit 18 and can at least partially adapt or else newly store the adaptation configuration 24 depending on the command.

In some embodiments, the control unit 19 is electrically connected to the further memory 17 by means of a fourth data line 28. The functional unit 18 is also electrically connected to the control unit 19 via a fifth data line 29. In particular, data can be transmitted in both directions or bidirectionally via the fifth data line 29. Data can therefore be transmitted from the control unit 19 to the functional unit 18. However, data can also be transmitted from the functional unit 18 to the control unit 19.

In some embodiments, the first energy storage unit 6 is in the form of an on-demand energy store or protection store and the second energy storage unit 9 is in the form of a normal energy store. After the first energy storage unit 6 has been directly connected to the functional unit 18 via the third data line, the protection energy store can therefore be used to maintain the functionality of the functional unit 18 in the event of failure, in particular of the second energy storage unit 9.

LIST OF REFERENCE SIGNS

1 Motor vehicle
2 Control apparatus
3 First energy system
4 Second energy system
5 Third energy system
6 First energy storage unit
7 First electrical load
8 First energy generation unit
9 Second energy storage unit
10 Second electrical load
11 Second energy generation unit
12 Third electrical load
13 DC-DC converter
14 First switch
15 Second switch
16 Non-volatile memory
17 Further memory
18 Functional unit
19 Control unit
20 First memory part
21 Second memory part
22 First initial configuration
23 Second initial configuration
24 Adaptation configuration
25 First data line
26 Second data line
27 Third data line
28 Fourth data line
29 Fifth data line

The invention claimed is:
1. A control apparatus for an energy storage unit of a motor vehicle, the control apparatus comprising:

a non-volatile memory storing a first initial configuration for a first energy storage unit and a second initial configuration for a second energy storage unit;

wherein the non-volatile memory is connected in a data-transmitting manner to a further memory having a first adaptation configuration for the first energy storage unit and a second adaptation configuration for the second energy storage unit;

the non-volatile memory comprises a first memory part storing the first initial configuration and a second memory part electrically decoupled from the first memory part storing the second initial configuration.

2. The control apparatus as claimed in claim 1, wherein:

the first memory part is electrically connected to the further memory with a first data line; and the second memory part is electrically connected to the further memory using a second data line which differs from the first data line.

3. The control apparatus as claimed in claim 1, wherein the first memory part is connected to a voltage supply for the first energy storage unit and/or the second memory part is connected to a voltage supply for the second energy storage unit.

4. The control apparatus as claimed in claim 1, wherein the further memory is connected to a voltage supply for the second energy storage unit.

5. The control apparatus as claimed in claim 1, further comprising a processor controlling the first energy storage unit and the second energy storage unit on the basis of the first initial configuration and the second initial configuration; and the processor is electrically connected directly to the first memory part by a third data line.

6. The control apparatus as claimed in claim 5, wherein the processor is connected to a voltage supply for the first energy storage unit and to a voltage supply for the second energy storage unit.

7. The control apparatus as claimed in claim 1, wherein the further memory is electrically connected to a controller which adapts the adaptation configuration on the basis of a processor of the control apparatus.

8. The control apparatus as claimed in claim 1, wherein the first energy storage unit comprises an on-demand energy store and the second energy storage unit comprises a normal energy store.

9. The control apparatus as claimed in claim 1, wherein the further memory comprises a volatile memory.

10. A method for operating a first energy storage unit and a second energy storage unit of a motor vehicle, the method comprising:

reading a first initial configuration of the first energy storage unit and a second initial configuration of the second energy storage unit from a non-volatile memory;

wherein the first initial configuration is read from a first memory part of the non-volatile memory; and the second initial configuration is read from a second memory part of the non-volatile memory which is decoupled from the first memory part.

* * * * *